Sept. 27, 1955 W. L. HANKINS, JR 2,719,051
OIL WELL FISHING TOOL
Filed Dec. 15, 1952

Willie L. Hankins, Jr.
INVENTOR.

United States Patent Office 2,719,051
Patented Sept. 27, 1955

2,719,051

OIL WELL FISHING TOOL

Willie L. Hankins, Jr., Kilgore, Tex., assignor of one-half to H. W. Donnell, Kilgore, Tex.

Application December 15, 1952, Serial No. 326,050

2 Claims. (Cl. 294—96)

This invention relates to an oil well fishing tool and particularly for a tool adapted to extend into and make connections with and be detached from tubular members in the well.

In the operation of oil well structures it is frequently desirable to be able to make connections to tubular members such as casings or other tubular members which may be at a distance from the top of the well. Various elements have been provided for making engagement with the interior of these devices and since such devices are sometimes immovable it is frequently desirable to be able to detach the tool after it has taken hold of the lost tubular member.

The present invention provides a mandrel body having slip members mounted on the outside thereof and the mandrel for moving the slip members into engagement with the inner surface of a tubular device into which the fishing tool has been lowered. The mandrel is provided with an axial passage therethrough of sufficient size that a charge of dynamite or other explosive may be lowered through the fishing tool and exploded below the same to release the tubular member to which the fishing tool is engaged. Further the fishing tool is provided with a left-hand thread arrangement for positioning the mandrel with respect to the slips so that if desired the mandrel may be rotated to reposition the same on the mandrel body so that the slips may be loosened and allow the fishing tool to be removed from a cylindrical object in which it has been secured.

It is accordingly an object of the invention to provide an improved fishing tool.

It is a further object of the invention to provide a fishing tool having an axial passage therethrough.

It is a further object of the invention to provide a fishing tool having slips slidably positioned on the exterior surface thereof.

It is a further object of the invention to provide a mandrel which may be positioned with respect to the slips to allow them to be detached from any material to which they are attached.

Other objects and many of the attendant advantages of the present invention will be apparent from the following detailed description taken in conjunction with the accompanying drawing in which.

Figure 1:
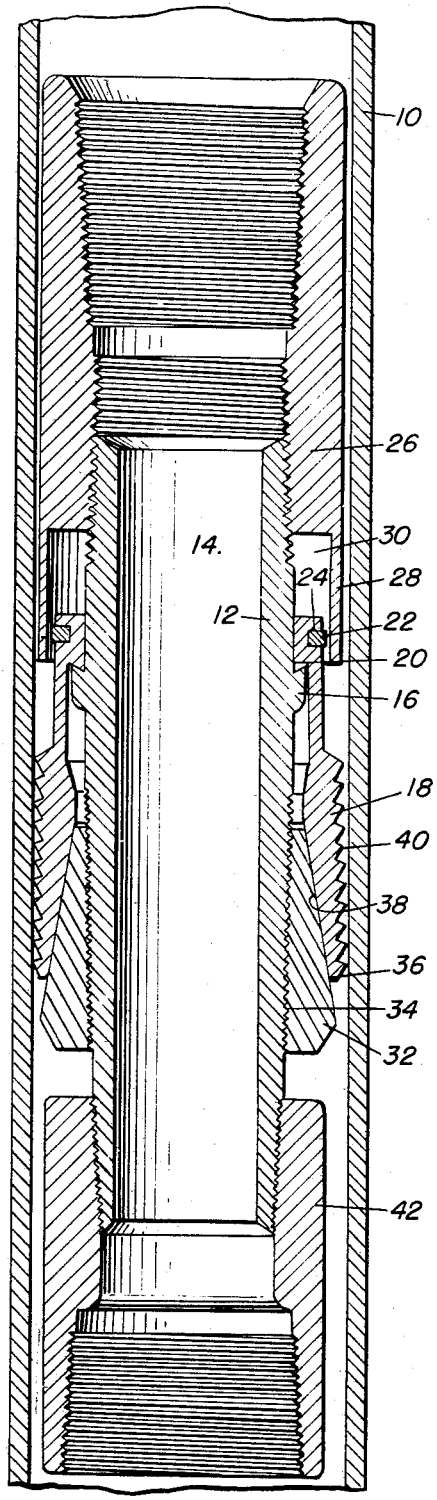
Figure 1 is a sectional elevation of a fishing tool according to the invention.
Figure 2:
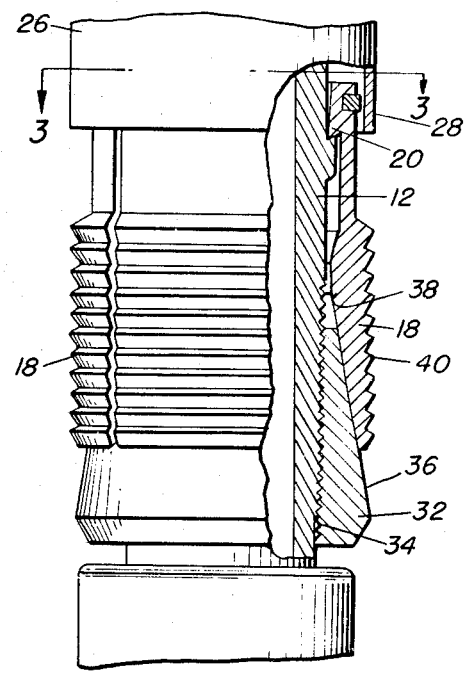
Figure 2 is a fragmentary elevation of the fishing tool showing the arrangement of an anchoring support for the slips.
Figure 3:
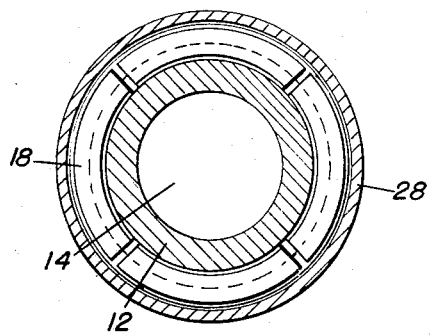
Figure 3 is a cross section through the tool taken substantially on the plane indicated by the line 3—3 of Figure 2 and showing the relationship of the parts therein.

In the exemplary embodiment of the invention a tubular object such as a casing 10 is shown receiving the fishing tool which will be supported by a tubular element not shown. The fishing tool proper includes a mandrel body 12 having a longitudinal passage 14 therein. The circumferential outwardly extending stop member 16 is provided on the mandrel body 12 intermediate the ends thereof and preferably adjacent the top end thereof. A plurality of segmental slips 18 are arranged in annular arrangement around the body 12 and are provided adjacent the top thereof with inwardly directed shoulders 20 for engagement with the top of the stop member 16. Preferably the stop member 16 is provided with an upwardly directed slope and the shoulders 20 are provided with a downwardly directed slope so that they interfit with each other to provide a tenacious grip between the stop 16 and the shoulders 20. A retainer ring 22 is provided in grooves 24 adjacent the top of the slip members 18 and serve to retain the slip members in assembled relation on the body 12. A top collar 26 is threadedly engaged with the top end of the body 12 and serves to connect the body 12 to the string of tools or tubing (not shown) on which it is supported. A depending skirt 28 is provided adjacent the bottom of the collar 26 and extends in spaced relation to the sides of the body 12 to provide a substantially cylindrical chamber 30 in which the tops of the slips may slide to allow them to adjust as may be desired when lowering the fishing tool into a well.

A tapered mandrel 32 is positioned on the body 12 by means of left-hand threads 34. The threads 34 being left-hand and opposite to the threads of the remaining portion of the tool so that the body 12 may be turned with relation to the mandrel 32 to cause motion of the mandrel 32 along the body 12. The outer tapered surface 36 of the mandrel 32 engages an inwardly tapered surface 38 of the slips 18 so that the mandrel will expand the slips to cause the teeth 40 on the exterior of the slips to engage the interior surface of a tubular member such as the casing 10 into which the fishing tool may be lowered.

The teeth 40 are substantially flat on their upper surface but incline slightly downward at an angle of approximately 15° from the horizontal. The teeth being backed up by a long sloping back having an angle upwardly from the horizontal of approximately 60°. This produces a strong sharp formed tooth which may be readily engaged with the implement into which it is lowered and will have sufficient strength to bite into and retain itself therein. The head 42 is threadedly engaged or otherwise mounted on the bottom end of the body 12 and serves as a stop to prevent removal of the mandrel 32 from the body 12. The head 42 as well as the collar 26 is provided with an axial passage therein so that dynamite or other explosive may be readily lowered through the device.

In the operation of the fishing tool according to the invention, the mandrel 36 is positioned upwardly as far as the threads 34 will permit and then turned down approximately a half a turn to make sure that the mandrel will be free running on the threads 34. The tool will then be lowered into the well and the slips 18 will slide upwardly on contact with any material in the well so that the shoulders 20 will slide upwardly in the cylinder 30 and the surface 38 will remove itself from contact with the sloping surface 36 so that the segmental slips 18 will be drawn to the fullest possible extent so that the entire fishing tool may if desired be passed through a tubular member and engage a larger tubular member after passing through the smaller tubular member. When the tool has been lowered into position it will be drawn back sharply so that the slips 18 will be firmly gripped between the mandrel 32 and the tubular member 30 so that the teeth 40 will have a good firm grip therewith. If desired, a charge of explosive, such as dynamite may be lowered through the passage 14 and utilized to shoot off or otherwise disengage the tubular member to which the fishing tool is connected.

In the event it should prove impossible to lift the member to which the fishing tool is connected it may be readily disconnected by rotating the body 12 so that the mandrel 32 will move downwardly along the body 12 and out of contact with the surface 38 of the slips 18 so that the slips 18 may be retracted from contact with the member 12 and readily withdrawn from the hole.

It will thus be seen that the present invention provides a fishing tool particularly adapted to be lowered into a well to engage or be disengaged from tubular members left therein.

While for purpose of exemplification a particular embodiment of the invention has been shown and described according to the best present understanding thereof, it will be apparent to those skilled in the art that many changes may be made in the construction and arrangement of the parts thereof without departing from the true spirit of the invention.

What is claimed as new is as follows:

1. An oil well fishing tool comprising an elongated tubular body having an unobstructed bore therethrough, an outstanding stop member intermediate the ends of said tubular body, a plurality of segmental slips assembled on said tubular body, a retaining ring mounted around said slips adjacent upper ends thereof, downwardly directed shoulders on said slips adjacent upper ends thereof for engagement with said stop member, a collar carried by the upper end of said tubular body retaining said slips thereon, a tapered mandrel carried by said tubular body below said stop member, said tapered mandrel being engageable with lower portions of said slips to move said slips into gripping position upon upward movement of said mandrel relative to said slips, said collar having a depending skirt normally surrounding the upper ends of said slips, said skirt forming a chamber for receiving and protecting upper ends of said slips in retracted positions, said skirt being disposed closely adjacent outer surfaces of the upper ends of said slips and further serving to retain said slips on said tubular body in the event of failure of said retaining ring, said skirt, said tubular body and said mandrel being movable upwardly as a unit relative to said slips whereby said slips may be fully extended to engage a relatively large member to be removed.

2. An oil well fishing tool comprising an elongated tubular body having an unobstructed bore therethrough, an outstanding stop member intermediate the ends of said tubular body, a plurality of segmental slips assembled on said tubular body, a retaining ring mounted around said slips adjacent upper ends thereof, downwardly directed shoulders on said slips adjacent upper ends thereof for engagement with said stop member, a collar carried by the upper end of said tubular body retaining said slips thereon, a tapered mandrel carried by said tubular body below said stop member, said tapered mandrel being engageable with lower portions of said slips to move said slips into gripping position upon upward movement of said mandrel relative to said slips, said collar having a depending skirt normally surrounding the upper ends of said slips, said skirt forming a chamber for receiving and protecting upper ends of said slips in retracted positions, said skirt being disposed closely adjacent outer surfaces of the upper ends of said slips and further serving to retain said slips on said tubular body in the event of failure of said retaining ring, said skirt, said tubular body and said mandrel being movable upwardly as a unit relative to said slips whereby said slips may be fully extended to engage a relatively large member to be removed, said collar being provided with an internally threaded upper end to facilitate connection to a tool string.

References Cited in the file of this patent

UNITED STATES PATENTS

| | | |
|---|---|---|
| 1,414,511 | Gray | May 2, 1922 |
| 1,496,985 | Gray | June 10, 1924 |
| 1,762,621 | Gray | June 10, 1930 |
| 1,825,026 | Thomas | Sept. 29, 1931 |
| 2,121,634 | Humason | June 21, 1938 |